United States Patent
Hill et al.

[11] Patent Number: 5,987,605
[45] Date of Patent: Nov. 16, 1999

[54] METHODS AND APPARATUS FOR DUAL-BOOT MEMORY SELECTION, UPDATE, AND RECOVERY IN A PROGRAMMABLE DEVICE

[75] Inventors: Gregory Hill, Loveland; Raymond A. Purcell, Fort Collins; Charles D. Platz; Glen Atkins, both of Loveland; Lee Atchison, Fort Collins, all of Colo.

[73] Assignee: Hewlett-Packard Co., Palo Alto, Calif.

[21] Appl. No.: 09/032,687

[22] Filed: Feb. 28, 1998

[51] Int. Cl.⁶ .................................................. G06F 9/445
[52] U.S. Cl. ................................................ 713/2; 713/100
[58] Field of Search ................................. 395/652, 500, 395/650, 700, 490, 651; 713/1, 2, 100, 23

[56] References Cited

U.S. PATENT DOCUMENTS

| | | | |
|---|---|---|---|
| 5,355,498 | 10/1994 | Provino et al. | 395/700 |
| 5,432,927 | 7/1995 | Grote et al. | 395/575 |
| 5,450,576 | 9/1995 | Kennedy et al. | 395/650 |
| 5,463,766 | 10/1995 | Schieve et al. | 395/650 |
| 5,519,870 | 5/1996 | Kannan et al. | 395/700 |
| 5,659,748 | 8/1997 | Kennedy et al. | 395/652 |
| 5,694,600 | 12/1997 | Khenson et al. | 713/2 |
| 5,701,477 | 12/1997 | Chejlava, Jr. | 713/2 |
| 5,748,940 | 5/1998 | Angelo et al. | 395/490 |
| 5,768,563 | 7/1993 | Porter et al. | 395/500 |
| 5,805,882 | 7/1996 | Cooper et al. | 395/652 |
| 5,826,075 | 10/1998 | Bealkowski et al. | 395/600 |
| 5,898,869 | 9/1999 | Anderson | 713/2 |
| 5,909,437 | 5/1999 | Rhodes et al. | 370/349 |

*Primary Examiner*—Joseph E. Palys
*Assistant Examiner*—RiJue Mai

[57] ABSTRACT

Methods and associated apparatus for using a dual-boot capable programmable device and for updating programmed information in such a dual-boot capable programmable device. The apparatus of the present invention includes a primary boot memory device, a secondary boot memory device, and means for selecting between the two memory devices for purposes of "booting" the dual-boot mode device. In particular, a reset switch of the apparatus of the present invention resets devices in the dual-boot capable programmable device and is coupled to a selection device. The selection device multiplexes signals from the two boot memory devices onto the corresponding bus signals of the dual-boot capable programmable device. When a "long" reset switch activation is sensed, the selection device selects a first of the two boot memory devices for coupling to the programmable device. A "short" activation of the reset switch selects the other boot memory device. The present invention also includes methods for updating the contents of the two boot memory devices so as to avoid an inoperable state encountered due to failure of the update process in a single boot memory device. In particular, both boot memory devices are updated in sequence. The second memory update is prevented if the first memory update is determined to have failed.

19 Claims, 4 Drawing Sheets

METHODS AND APPARATUS FOR DUAL-BOOT MEMORY SELECTION, UPDATE, AND RECOVERY IN A PROGRAMMABLE DEVICE

BACKGROUND OF THE INVENTION

1. Field of the Invention

The present invention relates to program updates in programmable devices and in particular to a method and associated apparatus for performing program updates in a dual-boot programmable device and for using such a dual-boot capable device.

2. Discussion of Related Art

It is generally known in the art to provide updatable boot instruction sequences for initial loading in a programmable device. As used herein, "programmable device" includes processors, field programmable logic devices, and other programmable electronic devices. Processors are computing devices which execute programmed instructions stored in an associated memory (or internally within a cache memory associated with the processor). A processor fetches and executes boot instruction sequences from a memory device to initialize it's operation for a desired application. Field programmable logic devices (FPLDs) are electronic circuits are devices which contain arrays of boolean logic electronic circuits (typically within a single integrated circuit). The interconnections among the various logic circuits are defined by a programmed sequence loaded into the FPLD from an associated memory device (e.g., boot instructions sequences). Further, as used herein, "boot instruction sequences" is intended to broadly include any programmed information which is a loaded or fetched by a programmable device associated with the boot instruction sequences.

Typically, such boot instruction sequences are stored in a memory associated with the programmable device. For example, in a typical personal computing system, a memory device (e.g., a ROM BIOS chip) stores the initial instructions to be executed by the central processing unit (CPU) of the personal computer. When such a personal computer is reset or initially powered on, the central processing unit fetches boot instructions directly from the ROM memory device. Or, for example, an FPLD in a particular application may initially load its configuration from an associated memory device. The initial configuration defines the Boolean logic functions to be performed by the FPLD in its intended application.

The memory device containing the boot instruction sequence is often updatable in the sense that the instructions (the logic functions) contained therein may be re-programmed with updated instructions. For example in a typical personal computer, the boot instructions are often stored in a flash memory device which may be electronically erased in re programmed by instructions operating in the central processing unit. Or for example, a field programmable logic device may be initially programmed upon reset by information stored in a such a flash or programmable memory device associated with the field programmable logic device or updated by instructions operating in an associated processor.

The memory device containing such boot information (program instructions, programmed logic, etc.) are typically updated by first erasing the contents of the memory device then programming the memory device with the updated boot information. A problem can therefore arise if the update sequence fails in some manner. The memory device in case of such a failure may be left in a state wherein it is unusable. For example, the erasure of the memory device may have completed but the re-programming may have failed or the re-programming may have partially failed. If the boot memory device is left in such an unusable state, the entire application may be shut down (e.g., the computer may fail to run or the circuit in which an FPLD is embedded may fail to operate).

In view of the above discussion, is clear that a need exists for improved methods and associated apparatus for using and updating boot memory devices associated with programmable electronic devices.

SUMMARY OF THE INVENTION

The present invention solves the above and other problems, thereby advancing the state of the useful arts, by providing multiple boot memory devices, methods for updating the multiple boot memory devices, and methods for selecting between such multiple boot memory devices. Though the present invention preferably utilizes two memory devices to define dual boot memory devices, it may be applied to any plurality of boot memory devices used in conjunction with a programmable device.

In particular, the present invention provides for a primary and secondary boot memory device, each containing boot instructions used by the associated programmable device (e.g., processor or FPLD). As noted above, the boot information may be program instructions used by a central processing unit or may be programmed logic used by an FPLD, or any other programmed information to be read, fetched, or loaded by or into a programmable device.

Methods and associated apparatus of the present invention enable selection of either the primary of secondary boot memory device for initial use by the associated programmable device. In particular, the present invention provides for a reset switch coupled to sensing circuits which distinguish a long activation of the reset switch from a short activation thereof. Selection circuits associated with the sensing circuits select the primary or secondary boot memory device for use by the programmable device in response to the long or short activation sensed by the sensing circuits.

The boot memory device selected by the reset sending features of the present invention is referred to herein as the active memory (or presently active memory) whereas the memory (or memories) not so selected is referred to as inactive memory (or presently inactive memory). Therefore, either the primary or secondary boot memory device may be deemed the presently active memory by operation of the sensing and selection features of the present invention. In other words, the presently active memory is the one used to boot the programmable device.

Other methods and apparatus of the present invention help reduce the chance of disabling operation of the system or programmable device by allowing only sequential updates of the two boot memory devices. An update to the primary boot memory device must complete successfully before the secondary boot memory device is permitted to be updated (and vice versa).

The combination of the methods and apparatus of the present invention allow a system or device to be reliably "booted" from one of the two (or more) boot memory devices despite the present status of updating of the boot memory devices. At least one of the two boot memory devices is assured to be valid and usable at any time during the update procedures. Further, sensing and selection circuits and methods operable in conjunction with the reset switch allow selection of the known valid boot memory device for initial operation of the system or device.

The above, and other features, aspects and advantages of the present invention will become apparent from the following descriptions and attached drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
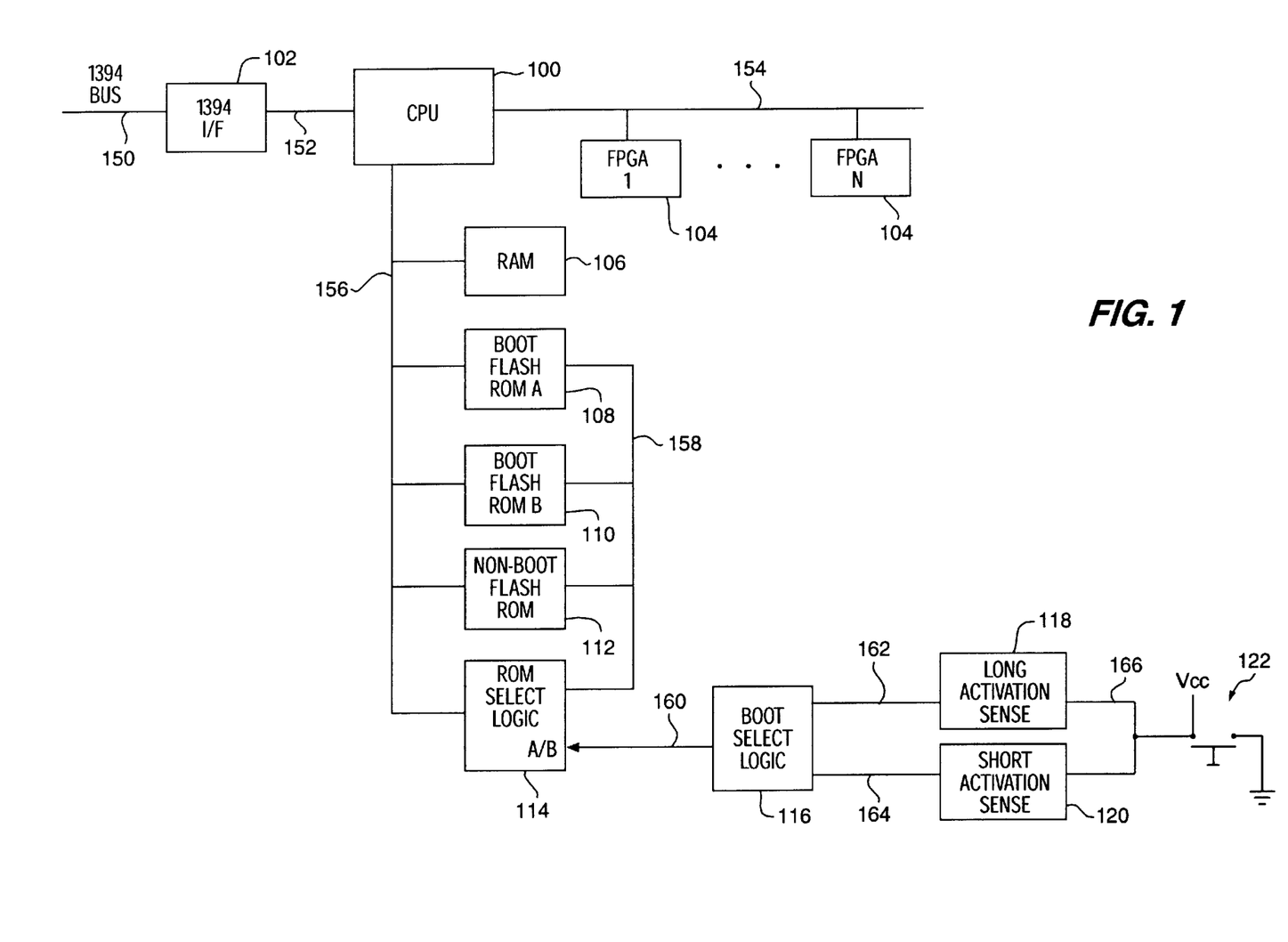
FIG. 1 is a block diagram of an exemplary system in which the dual-boot memory apparatus and methods of the present invention are advantageously applied.

FIG. 1 is a block diagram depicting a typical system in which the methods and apparatus of the present invention may be advantageously applied. CPU 100 controls the overall operation of the system depicted in FIG. 1. CPU 100 fetches instructions and data via bus 156 from ROM memory 108, 110, or 112 in accordance in with controls generated by ROM select logic 114 and applied via bus 158 to ROM memory devices 108 through 112. CPU 100 also manipulates data and/or program instructions in RAM memory 106. Memories 106 through 112 and ROM select logic 114 are accessed by CPU 100 via bus 156.

CPU 100 is connected to external devices via IEEE 1394 bus 150 through 1394 interface 102 and bus 152. Field programmable gate arrays (FPGA) 104 are used in the system to customize the operation thereof. The FPGA's 104 are shown as connected to CPU 100 via bus 154. Those skilled in the art will readily recognize that the FPGA 104 may be adapted to perform any particular useful application-specific function required by the system exemplified in FIG. 1. An external device connected to CPU 100 via IEEE 1394 bus 150 may request that program instructions (boot information) stored in boot flash ROM A 108 or boot flash ROM B 110 B be updated with a more recent version of boot information. As noted above, the boot information may include instructions fetched and executed by CPU 100 and/or programming information used to configure and operate FPGA's 104.

A request by an external device to update boot information in ROM memory 108 or 110 is accompanied by the new boot information to be re-programmed into the boom ROM memories 108 or 110. CPU 100 receives the updated boot information supplied by the external device via IEEE 1394 bus 150 and programs the updated boot information into the boot ROM memories 108 and 110 in accordance with the methods of the present invention as discussed herein below.

ROM select logic 114 enables and disables the various ROM memories 108 through 112 in accordance with address values supplied by CPU 100 and select signals generated by boot select logic circuits 116 and applied to bus 160. Boot select logic circuits 116 determine whether boot ROM memory A 108 or boot ROM memory B 110 should be selected in accordance with inputs applied thereto on paths 162 and 164. Signals generated by long activation sense circuits 118 and short activation sense circuits 120 are applied to paths 162 and 164, respectively. Long activation sense circuits 118 and short activation sense circuits 120 both receive the signal generated by reset switch 122. Those skilled in the art will recognize that the reset signal generated by switch 122 (coupled with appropriate pull-up and/or pull-down resistors) may be applied to other circuits in the interface of the present invention. As shown in FIG. 1, only aspects of the reset signal relevant to the sensing and selection circuits of the present invention are shown. Sense circuits 118 and 120 determine based on the duration of activation of reset switch 122 whether a long activation of the switch is sensed or a short activation of the switch is sensed. When a short activation of reset switch 122 is sensed by sense circuits 120, a signal so indicating is applied to path 164. In like manner, a long switch activation sensed by sense circuits 118 generates a signal on path 162. The signals applied to paths 162 and 164 cause boot select logic circuits 116 to generate an appropriate signal applied via bus 160 to ROM select logic 114. ROM select logic 114, in turn, applies appropriate signals to bus 158 to select an appropriate memory device for CPU 100 access to boot information in one of boot ROM memories 108 and 110. CPU 100 then accesses requisite boot information from the selected one of the dual boot flash ROMs 108 and 110 via bus 156. Other information unrelated to boot information is stored in non-boot flash ROM 112 and accessed as required by CPU 100 via bus 156.

Those skilled in the art will readily recognized that the application of the methods and apparatus of the present invention as depicted in FIG. 1 is intended only as exemplary of one preferred embodiment of the present invention. Those skilled in the art will readily recognize a variety of systems in which the methods and apparatus of the present invention, as described in further detail below, maybe advantageously applied. Furthermore, those skilled in the art will readily recognize that FPGA's 104 are representative of a wide variety of field programmable logic devices which may also directly access boot information stored in boom ROM memories 108 and 110. Logic and circuits within such FPLDs may directly access associated memory devices (e.g., boot ROM memories 108 and 110) to load programmed logic information (generally referred to herein as boot information). CPU 100 is therefore not a requirement in all applications of the methods and apparatus of present invention.

As noted above, one aspect of the present invention includes circuits and methods for selecting among the plurality of boot memory devices based upon sensing particular activation types of a reset switch. In particular, as depicted in FIG. 1, reset switch 122 is connected to activation sense circuits 118 and 120. Activation sense circuits 118 and 120, in general, determine whether the reset switch 122 has been activated for a "short" duration or a "long" duration. More specifically, long activation sense circuits 118 determines that reset switch 122 has been activated for longer than a predetermined long duration. Similarly, short activation sense circuits 120 determines that reset switch 122 has been activated for less than a predetermined short duration. As noted above, specific circuits for recognition of a short activation of reset switch 122 may be unnecessary. In other words, in the preferred embodiment, a short activation of reset switch 122 is sensed as any activation of reset switch 122 which is shorter than the predetermined long duration.

Boot select logic circuit 116 generates a signal selecting boot flash ROM A 108 or boot flash ROM B 110 based upon signals generated by long activation sense circuits 118 and short activation sense circuits 120. Boot select logic 116 may include, for example, user selectable options which associate boot flash ROM A 108 with either a long or short activation (a first activation type) of the reset switch 122 and boot flash ROM B 110 with the other or second activation type. Such a user configuration selection (e.g., jumper configurations or other means for user selection) allows flexibility in associating one of the dual boot ROMs with a first activation type and the other dual-boot ROM with a second activation type. For simplicity in most applications of the present invention including the preferred embodiment, such flexibility is not required. Therefore, boot select logic 116 performs a fixed mapping of a short activations of the reset switch 122 to booting from boot flash ROM A 108 and maps a long activation of reset switch 122 to booting from boot flash ROM B 110.

The selection signal generated by boot select logic circuits 116 is applied to ROM select logic 114 which in turn generates signals associated with address decode and memory chip selection required to physically select the desired boot ROM memory device. As noted above, ROM select logic 114 applies chip select signals to the various ROM memory devices 108 through 112 via bus 158 in response to addresses generated by CPU 100 on bus 156 and in response to signals on path 160 generated by boot select logic circuits 116.

RESET ACTIVATION SENSE METHODS

Figure 3:
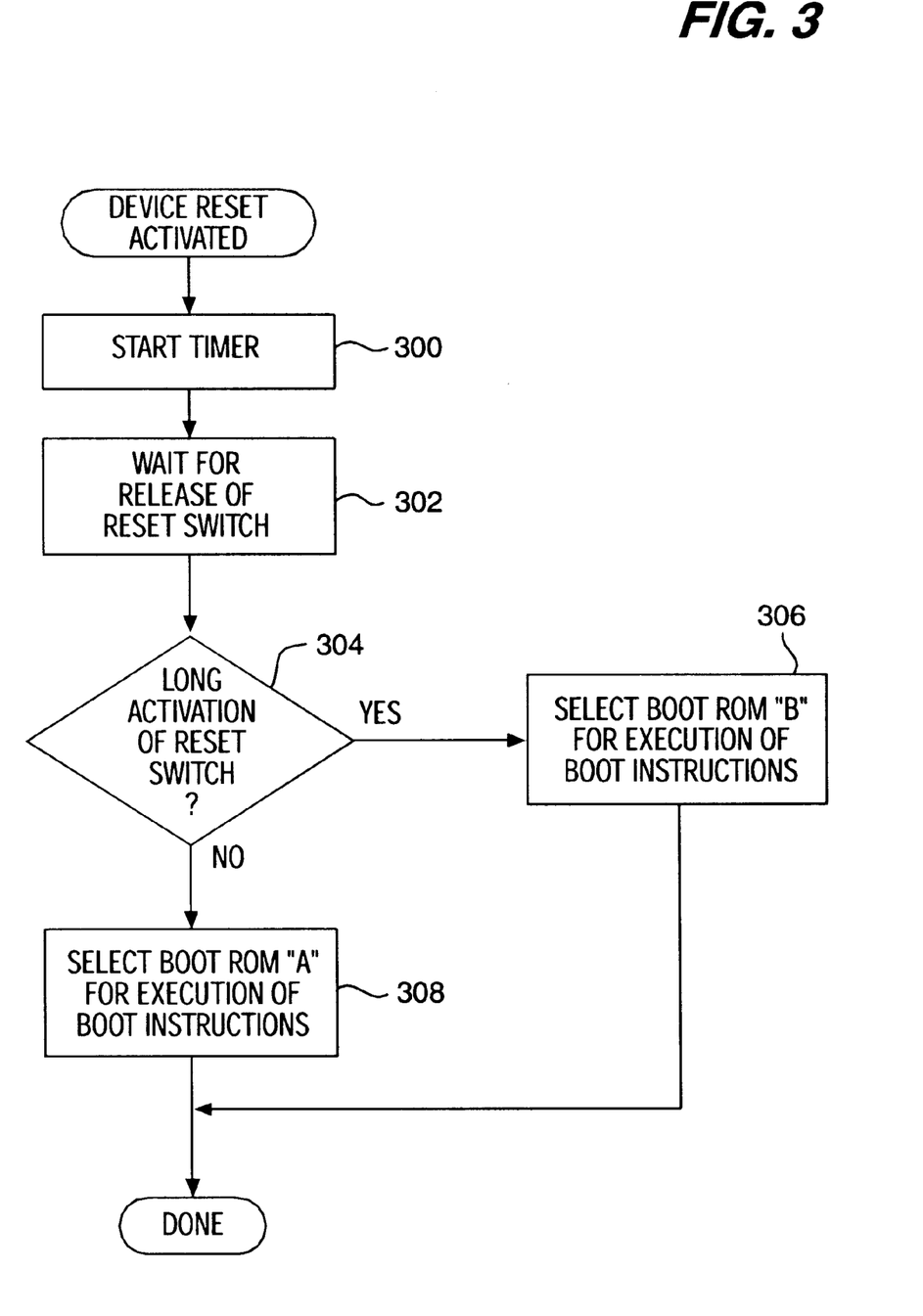
FIG. 3 is a flowchart describing the operation of methods of the present invention which select one of the dual-boot memory devices of the present invention in accordance with sensing an activation type for a reset switch associated with the system.

FIG. 3 is a flow chart describing the operation of the reset sensing and boot selection circuits of the present invention. The method described in FIG. 3 is operable within boot select logic circuits 116 and activation sense circuits 118 and 120. Those skilled in the art will readily recognize that the functions of boot select logic circuits 116 and activation sense circuits 118 and 120 are preferably implemented using simple electronic circuits rather than general-purpose programmable logic. The method depicted in FIG. 3 is therefore intended to broadly describe the operation of such boot selection and reset sensing circuits.

Element 300 is first operable in response to initially sensing the depression of reset switch 122. Element 300 starts a timer (e.g., a counter circuit) within the activation sense circuits 118 and 120. As noted above, those skilled in the art will recognize that sensing of a short activation of the reset switch 122 may be simply implemented by sensing any activation of reset switch 122 which does not exceed the long activation threshold. A single timer circuit within a single sense circuit (e.g., long activation sense circuits 118) therefore suffices in many applications (including the preferred embodiment) of the apparatus and methods of present invention.

Element 302 is next operable to await release of the depressed reset switch signifying end of the user activation of the reset switch. In response to sensing the release of the reset switch, element 304 is next operable (e.g., within long activation sense circuits 118) to determine whether the sensed activation of the reset switch exceeded the predetermined long activation duration threshold. The threshold value is predetermined and configured into long activation sense circuits 118 (e.g., through user configuration switches, jumpers, etc.).

For simplicity in the preferred embodiment, a single long activation threshold value is predetermined and "hard wired" in the long activations sense circuits 118. Further, in the preferred embodiment, a short activation is sensed as the absence of a long activation as noted above. Specifically, any reset switch activation is deemed a short activation until the duration of the activation exceeds the predetermined long duration threshold.

In response to element 304 sensing that the reset switch was activated for at least the long activation duration threshold, element 306 is next operable (e.g., within boot select logic circuits 116) to select, for example, boot flash ROM B 110 for execution or fetching of information by CPU 100 (or other programmable devices). In response to element 304 sensing that the reset switch was activated for less than the long activation duration threshold, element 308 is next operable (e.g., within boot select logic circuits 116) to select boot flash ROM A 108 for execution or fetching of boot information by CPU 100 (or other programmable devices). In both cases the method depicted in FIG. 3 thereby completes operation.

BOOT INFORMATION UPDATE METHODS

Figure 2:
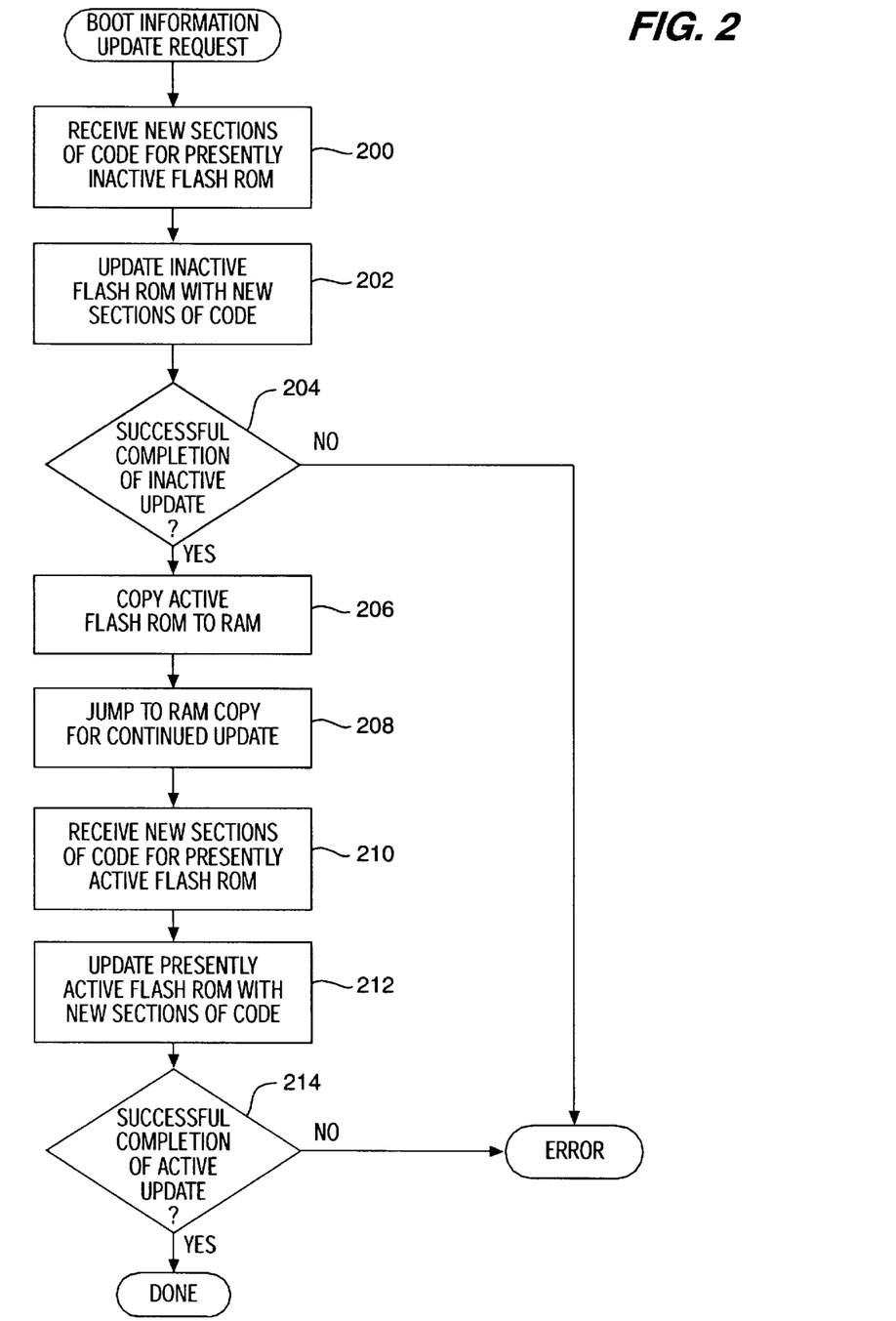
FIG. 2 is a flowchart describing the operation of methods of the present invention which serves to reliably update the boot information in the dual boot memory of the present invention.

FIG. 2 is a flow chart describing operation of methods of the present invention operable to assure reliable update of the boot memory devices of the present invention. The method depicted in FIG. 2 is operable in response to a request from an external device to update the boot information in the system embedding the apparatus and methods of the present invention. The method described in FIG. 2 is typically operable within a CPU embedded within a system operable accordance with the present invention. However, those skilled in the art will readily recognize that the method described by FIG. 2 may be operable within, or controlled by, other programmable devices and logic such as FPLDs. The general-purpose CPU is therefore not required for performing the update procedures described in FIG. 2.

Element 200 of FIG. 2 is first operable to receive updated sections of code for the presently inactive boot memory device. The code sections to be updated are received from the external device via the IEEE 1394 interface and temporarily stored in RAM to assure that the entirety of the sections to be updated are correctly received from the external device.

As used herein, the presently active boot memory device refers to the one from which the update procedure is functioning (i.e., from which the CPU performing the update is presently fetching and executing instructions). The inactive boot memory device is the other device not presently used to execute the update procedure. As noted herein above, the selection of the primary boot memory device or the secondary boot memory device is determined in part by sensing a particular type of activation of the reset switch.

Element 202 is next operable to update the presently inactive boot memory device with the new sections of boot information just received from the external device requesting the update. The newly received sections of code are programmed into the presently inactive flash ROM by standard techniques for programming such memory devices. Those skilled in the art will recognize that the sections of code to be updated may be the entire contents of the flash ROM device or merely portions that relate to the boot information which requires updating. Such design choices are well known to those in the art.

Element 204 is then operable to determine whether the updating (programming) of the presently inactive flash ROM was successful. Those skilled in the art will recognize a variety of well known error checking and correcting techniques which may be employed to verify proper updating of the inactive memory device. For example, in the preferred embodiment, a checksum value may be used to determine that the information as written to the flash ROM device is correct. Those skilled in the art will recognize a variety of equivalent error checking techniques which may be employed to verify the successful update of the presently active flash memory.

If element 204 determines that the update procedure completed successfully, the method continues with element 206 as discussed herein below. If the update procedure is determined to have failed, the method terminates with an error condition. Those skilled in the art will note that the procedure may optionally jump to the start of the update procedure (element 200) to retry the update procedure. Protocols between the external device and the present invention can denote such failure status and retry requests.

It will be noted that the presently active flash memory is not altered when element 204 determines that the update process failed with respect to the presently inactive flash memory. The update of the presently active memory is therefore prevented until the presently inactive memory is successfully updated. This assures that at least one of the two boot memory devices (namely the presently active boot memory device) will be maintained in a usable, consistent state despite the failure to update the presently inactive flash ROM.

When the method terminates with an error, the external device requesting the update may be notified and may thereby retry the update procedure. More specifically, whenever the programmable device embodying the present invention is restarted, the device will determine if a previous update procedure left the boot memory devices in an inconsistent or unusable state. If so, the device will request an update procedure be initiated by the attached external device. To determine that the dual boot memory devices are inconsistent, as noted above, checksum values and version/timestamp information may computed and compared for potential errors or inconsistencies. When an error or inconsistency is so detected, the programmable device will request an update procedure be instituted by the external device. The procedure as shown herein in FIG. 2 updates both flash boot memory devices to assure consistency. The restart procedures of the programmable device are described herein below with respect to FIG. 4.

If element 204 determines that the update procedure for the presently inactive flash ROM succeeded, element 206 is next operable to copy contents of the presently active flash ROM to another memory in the programmable device (e.g., RAM memory 106 of FIG. 1). The presently active flash ROM contents are copied so that the procedure may continue operation using the program instructions in the active memory but relocated to a new memory location so that the active memory contents are not overwritten while presently in use. Continuing the update procedure from another memory location permits the process to continue by updating the presently active flash ROM contents. Element 208 then "jumps" the execution of the procedure to the newly copied version of the presently active flash ROM instructions. Those skilled in the art will recognize that these steps relate to the update procedure of the present invention as applied to a processor executing instructions fetched from the dual boot memories of the present invention. Where the update procedure is embodied in special purpose logic circuits in the programmable device, the steps to copy the contents of the presently active boot information to another location may be unnecessary. In such embodiments of the present invention, the boot information may not comprise "programmed instructions" for performing the update procedure but rather contain programmable logic information or other circuit configuration information. The update procedure need not therefore "switch" execution of the procedure from one memory to another.

Element 210 is next operable to receive new sections of code for the presently active flash ROM. As above, the new sections of code are received via the IEEE 1394 interface and stored temporarily in RAM to assure that the entire update is received correctly. Those skilled in the art will recognize that the dual boot memory devices may contain identical boot information such that reception of new boot information for updating the active boot memory device is obviated. In the preferred embodiment as shown herein in FIG. 2, each of the boot devices may contain different code (though at compatible revision levels). For example, the primary boot memory device, preferably integrated with the processor device, may contain fully functional operating instructions whereas the secondary boot memory device, as an external memory device, may be slower to access and therefore contain only minimal instructions capable of restoring updated boot information into the primary boot memory device.

Element 212 is then operable to update the contents of the presently active flash ROM with the newly received code. Specifically, as above with respect to element 202, the newly received boot information is programmed into the presently active flash ROM using well known techniques for programming such memory devices.

Element 214 is then operable in a manner similar to that of element 204 to determine whether the update process was successful with respect to the active flash ROM. If the process was successful, the method completes with a successful update and further normal operation of the device may proceed. If the process is determined to have failed, an error condition is returned to the external device requesting the update procedure. As above, such an error condition may include a request from the programmable device that another update procedure be initiated by the external device. Also as above, a determination of such a failure may be made by computing checksums or other well known error detection techniques.

Those skilled in the art will readily recognized that FIG. 2 is intended merely as exemplary of an update procedure operable in accordance with the methods of the present invention. Similar procedures and methods, within the scope of the present invention, may be utilized to update the dual boot memory devices. Key aspects of the methods of the present invention reside in the use of dual boot memory devices and in the fact that the boot memory devices are updated in a sequential manner. The sequential nature of the dual-boot update procedure assures that the one of the two memory devices is known to be usable in that it contains usable, consistent, and operable boot information. Specifically, the presently active memory device is updated by the update procedure only in response to determining that the inactive memory device was successfully updated. The boot selection and sensing features of the present invention allow the user to select the one boot memory device which is known to be valid when the update procedure fails for any reason.

Figure 4:
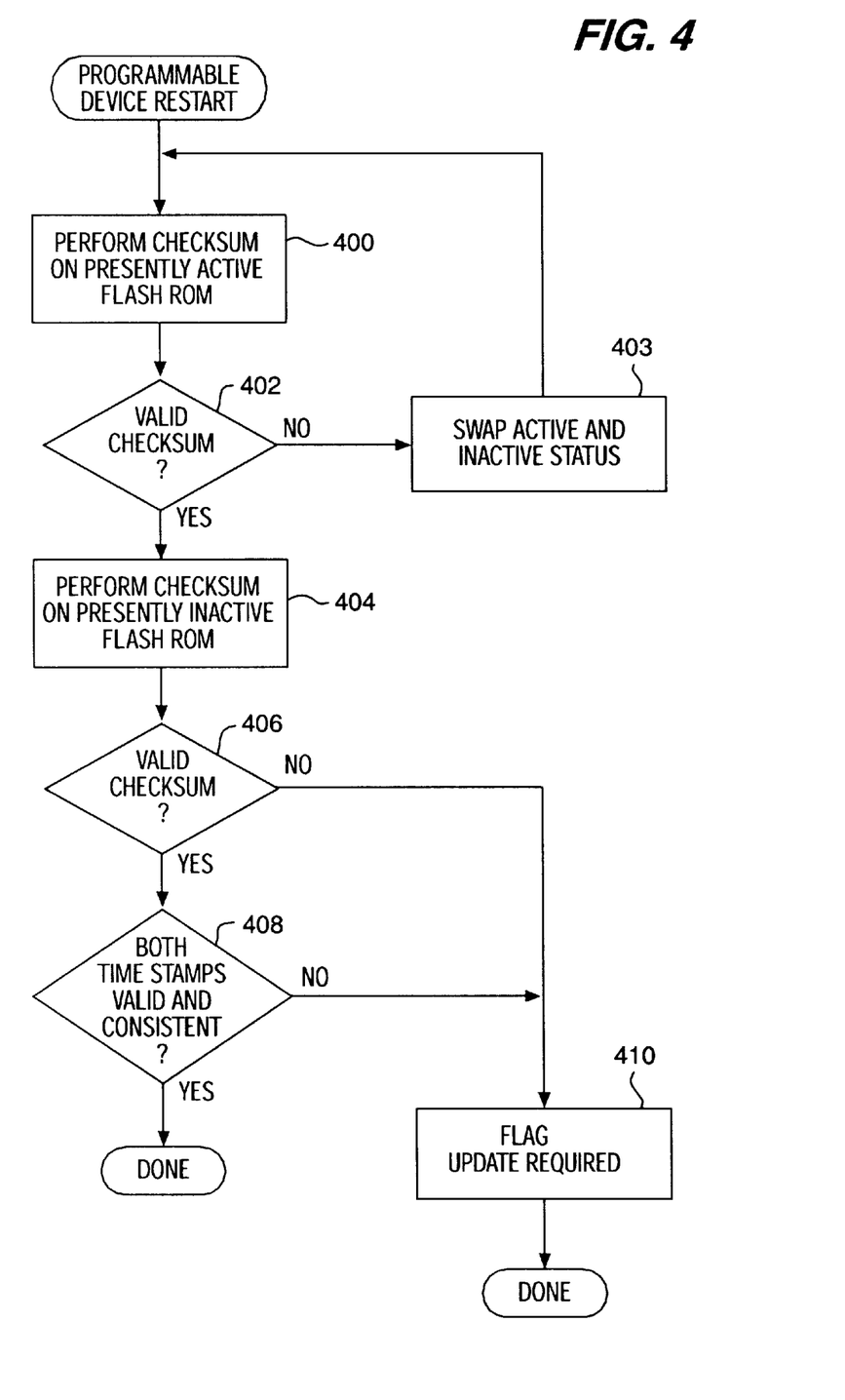
FIG. 4 is a flowchart describing the operation of methods of the present invention at restart of the programmable device to determine which of the dual boot memories is operable and whether an update procedure is required.

FIG. 4 is a flowchart describing methods of the present invention whereby the programmable device determines at startup whether the selected boot memory device (the active flash ROM) contains usable boot information and further determines the need for an update process. The method described in FIG. 4 presumes a programmable device embodying the methods of the present invention as programmed instructions fetched and executed by a processor device. Similar methods may also be embodied in custom circuits and logic as noted elsewhere herein.

Element 400 is first operable to perform a checksum calculation on the boot information in the presently active flash ROM. As noted above, the presently active flash ROM is the primary or secondary memory as selected by the user's activation of the reset switch (or non-activation of the reset switch as noted above). A checksum (or other equivalent error detection techniques) determines whether the contents of the presently active flash ROM are valid and may be used for operation of the programmable device. Element 402 is then operable to determine whether the computed checksum indicates valid content or invalid content in the presently active flash ROM. If element 402 determines that the checksum indicates a valid active memory, processing continues with element 404.

Otherwise, if the checksum computation and comparison of elements 402 and 404 indicate invalid contents in the active memory, processing continues with element 403 to swap the definition of active and inactive memory devices and to restart the process by looping back to element 400. The method of FIG. 4 will then repeat with the previously inactive flash ROM now used as the active flash ROM. If neither boot device can operate due to apparently invalid contents as indicated by the checksum computation and comparison of elements 402 and 404, the programmable device will be incapable of operation. Such a condition is specifically avoided by the methods of the present invention which assure that at least one of the devices retains operable boot information so long as the devices are electronically operable without a "hardware" failure.

If element 402 determines that the presently active memory contains valid boot information as indicated by the checksum computation, element 404 is next operable to compute the checksum value corresponding to the presently non-active boot memory device. In like manner to elements 400 and 402, elements 404 and 406 determine the validity of the contents in the presently non-active boot memory device. If element 406 determines that the presently non-active boot memory device contains apparently valid boot information, then element 408 is next operable to determine whether the two boot memory devices are consistent with respect to timestamp (or other version related) information. If both boot memory devices are consistent with respect to the version of boot information, the method completes and no update process is required.

If the presently non-active boot memory device is invalid or if the two boot memory devices contain inconsistent versions, element 410 is operable to request an update process from the external device attached via the IEEE 1394 interface. The method is then complete and the update process will eventually be commenced by the external device in accordance with the process described above in FIG. 2.

Other methods associated with the communication protocols used between the programmable device and the external device allow the external device to determine the present version of boot information presently loaded in the dual boot memory devices. The external device may thereby inquire as to the present version of the dual boot memories and determine that an update procedure is required. Therefore, in addition to the programmable device, per se, determining that an update is required due to errors or inconsistencies, the external device may also determine that an update is required in view of a new release of boot information available to the external device.

Those skilled in the art will recognize that FIG. 4 is intended merely as exemplary of a restart procedure operable in accordance with the methods of the present invention. Similar procedures and methods, within the scope of the present invention, may be utilized to restart the programmable device having dual boot memory devices in accordance with the present invention. Key aspects of the methods of the present invention reside in the processing that prevents use of invalid boot information and assures that the dual boot memory devices will contain consistent information by requesting an update from the attached external device.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method operable within a dual-boot capable programmable device for updating programmable information in said dual-boot capable programmable device comprising the steps of:

downloading updated boot information from an attached host into a primary boot memory device;

sensing success or failure of the step of downloading into said primary boot memory device; and downloading updated boot information from said host into a secondary boot memory device only in response to sensing successful completion of the step of downloading updated boot information into said primary boot memory device.

2. The method of claim 1 wherein said updated boot information consists essentially of boot instructions and wherein the method further comprises the step of:

downloading non-boot information into a non-boot memory device in said programmable device.

3. The method of claim 1 further comprising the steps of:

preventing downloading of said secondary boot memory device in response to sensing failure of the step of downloading updated boot information into said primary boot memory device.

4. The method of claim 3 further comprising the step of:

selecting, in response to the sensing of said failure, a preferred boot memory device as between said primary boot memory device and said secondary boot memory device.

5. The method of claim 4 further comprising the steps of:

sensing a short activation of a reset switch associated with said primary boot memory device and with said secondary boot memory device; and sensing a long activation of said reset switch.

6. The method of claim 5 wherein the step of selecting includes the steps of:

selecting said primary boot memory device in response to said sensing of said short activation of said reset switch; and selecting said secondary boot memory device in response to said sensing of said long activation of said reset switch.

7. The method of claim 1 wherein said boot information comprises programming information for configuring a field programmable logic device.

8. The method of claim 1 wherein said boot information comprises program instructions for execution within a processor.

9. The method of claim 8 wherein the method further comprises:

selecting said secondary boot memory for access by said processor during operation of the step of downloading updated boot information into said primary boot memory device; and selecting said primary boot memory for access by said processor during operation of the step of downloading updated boot information into said secondary boot memory device.

10. A method operable within a dual-boot capable device for using boot information in said dual-boot capable device having a reset switch comprising the steps of:

sensing a short activation of said reset switch;

using boot information from a primary boot memory device in said device in response to said sensing of said short activation of said reset switch;

sensing a long activation of said reset switch; and using boot information from a secondary boot memory device in said device in response to said sensing of said long activation of said reset switch.

11. The method of claim 10 wherein said boot information comprises program instructions for execution within a processor.

12. The method of claim 10 wherein said boot information comprises programming information for configuring a field programmable logic device.

13. A method operable within a dual-boot capable programmable device for initializing, aid dual-boot capable programmable device comprising the steps of:

determining the validity of boot information in a presently active one of a plurality of boot memory devices associated with the programmable device;

determining the validity of boot information in a presently inactive one of the plurality of boot memory devices in response to the step of determining that the boot information in the presently active boot memory device is valid; and updating the presently inactive boot memory device only in response to a determination that the boot information in the presently inactive boot memory device is invalid.

14. The method of claim 13 further comprising the steps of:

swapping the active and inactive status of the presently active and presently inactive boot memory devices in response to a determination that the boot information in the presently active boot memory device is invalid; and repeating the steps of the method in response to the swapping of the active and inactive status of the boot memory devices.

15. The method of claim 13 wherein the step of determining the validity of boot information in the presently active boot memory device includes the steps of:

computing a checksum value from the boot information in the presently active boot memory device; and verifying the validity of the boot information in accordance with the checksum value.

16. The method of claim 13 wherein the step of determining the validity of boot information in the presently inactive boot memory device includes the steps of:

computing a checksum value from the boot information in the presently inactive boot memory device; and verifying the validity of the boot information in accordance with the checksum value.

17. A dual-boot capable device comprising:

a primary boot memory device;

a secondary boot memory device;

a switch;

a sensor coupled to said switch and operable to sense a first type of activation of said switch and further operable to sense a second type of activation of said switch; and a selection circuit coupled to said sensor and to said primary boot memory device and to said secondary boot memory device, operable to select said primary boot memory device as a selected boot memory in response to sensing of a short activation of said switch and operable to select said secondary boot memory device as said selected boot memory in response to sensing of a long activation of said switch.

18. The device of claim 17 further comprising:

a field programmable logic device coupled to said primary boot memory device and to said secondary boot memory and to said selection circuit whereby said field programmable logic device loads programmed logic from said selected boot memory.

19. The device of claim 17 further comprising:

a processor coupled to said primary boot memory device and to said secondary boot memory and to said selection circuit whereby said processing device loads programmed instructions from said selected boot memory.

* * * * *